June 30, 1953  O. BOLTON  2,643,414
SAUSAGE PERFORATING MACHINE
Filed Dec. 12, 1949
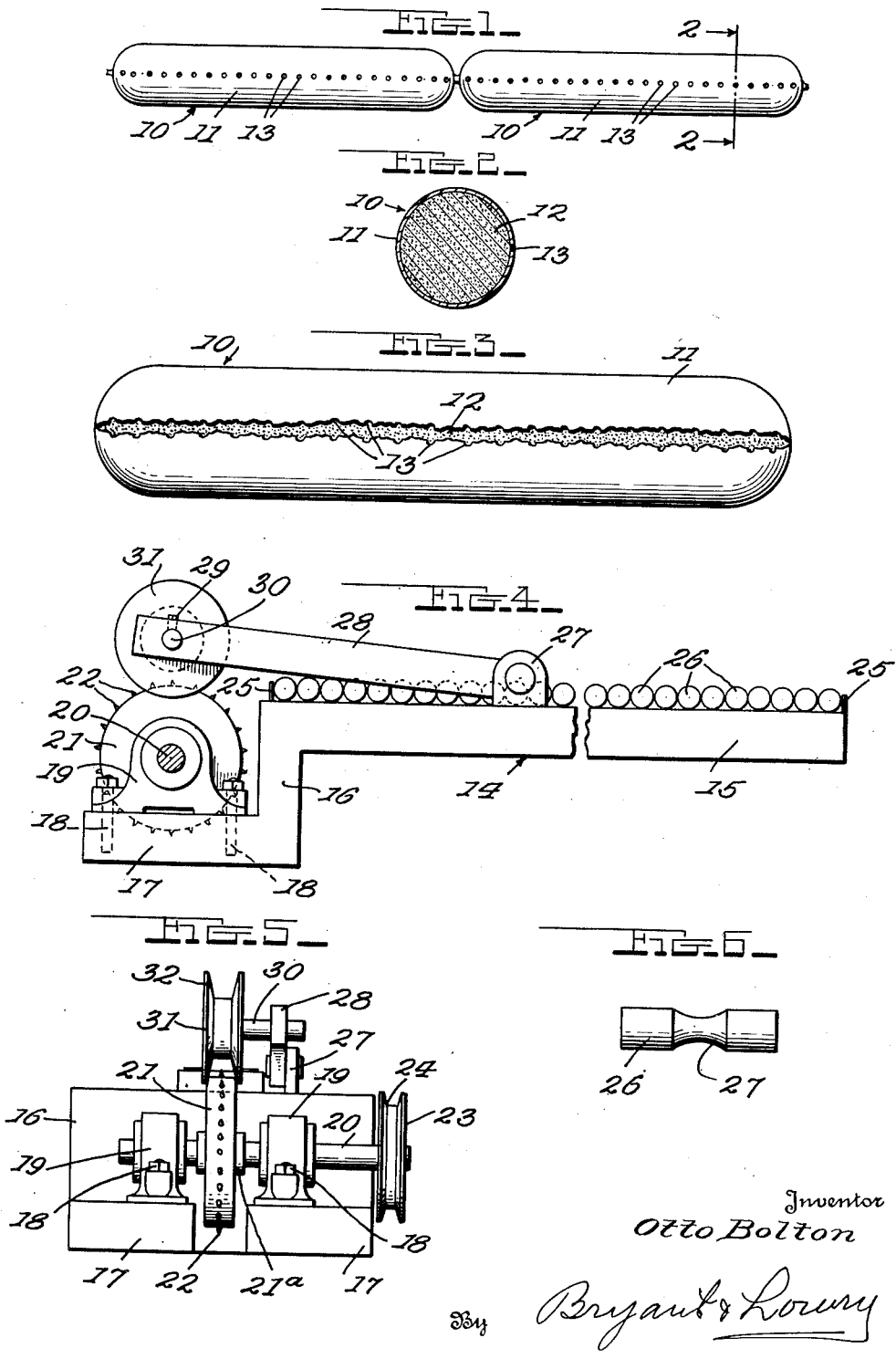
Inventor
Otto Bolton
By Bryant & Lowry
Attorneys Patented June 30, 1953

2,643,414

UNITED STATES PATENT OFFICE 2,643,414

SAUSAGE PERFORATING MACHINE

Otto Bolton, Denver, Colo.

Application December 12, 1949, Serial No. 132,567

2 Claims. (Cl. 17—1)

This invention relates to certain new and useful improvements in sausages and apparatus for producing the same.

In the meatpacking industry considerable effort has been devoted to the development of a skinless sausage or weiner. This has been in response to a consumer demand for a sausage which has the flavor and cooking properties of the old style sausage but which sausage when placed on the table for use does not have the tough, coarse casing in which the meat is stuffed during the manufacturing process.

In the older process for preparing sausages, an edible membrane casing is first prepared from the intestinal tracts of domestic animals, the natural shape of the intestine forming a tube which is cut to any desired length. The meat content is then ground, seasoned and stuffed tightly into the casing, a twist being put into the casing at spaced intervals to form links. The links are then smoked, cooked and colored, and are ready for distribution.

Probably the most common method of serving sausages produced by this process is by immersion in boiling water until the sausage reaches the desired eating temperature. It may be noted that during this heating operation the sausage often splits, becoming misshapen and losing desirable juices and flavor. If it is desired to remove the tough membrane skin, such as during the preparation for serving to children or invalids, the hot sausage must be peeled and the meat content usually adheres strongly to the casing, making such removal difficult and resulting in considerable waste.

In producing the so-called "skinless" sausage the steps are similar to that of the earlier process, with the exception that the links are formed in artificial casings and, when the smoking and cooking is completed, the casings are removed, the sausages then being marketed separately and without casings. It may be noted that the use of the artificial cellulose casing rather than a natural membrance casing is considerably more economical from a manufacturing viewpoint.

There are, however, several important disadvantages to the skinless sausage. Perhaps the most important is in the matter of sanitation, the most critical problem in the food processing industry. The advantage of the casing in the sanitary handling and shipping of the meat product is lost. The keeping qualities of the sausage are drastically reduced in that bacterial action starts more quickly and the meat dries out much more rapidly, losing flavor and texture.

Further, in the heating of the skinless sausage for table use, before the meat can be brought up to the desired temperature, much of the flavor and many of the natural juices have been extracted by the boiling water.

It is a principal object of this invention to provide a sausage which will have the keeping, handling and cooking qualities of the old style sausage while at the same time possessing the eating quality and economy of the skinless sausage.

It is a further object of the invention to provide a sausage with a removable casing wherein no human hands need touch the meat content from the time the casings are packed until the meat is served, the meat only being exposed after the heating operation and when it is served for consumption.

It is a further object of this invention to provide a sausage which is manufactured, marketed and heated for table use in an artificial cellulose casing, said casing automatically dropping off of the sausage at a predetermined point during the heating of the sausage for table use.

A still further object of this invention is to provide a sausage having a longitudinal row of spaced, minute perforations in the casing thereof which will cause the casing intermediate the perforations to be severed upon expansion of the meat content at the conclusion of the heating period.

A still further object of the invention is to provide an apparatus especially adapted for longitudinally perforating the sausage casings as the final step in the manufacturing process and just before the distribution of the product.

With the above and other objects in view, as will be presently apparent, the invention consists in general of certain novel details of construction and combinations of parts hereinafter fully described, illustrated in the accompanying drawings and particularly claimed.

In the accompanying drawings like characters of reference indicate like parts in the several views, and Fig. 1 is a side elevational view showing two links of a chain of sausage links which has been perforated in accordance with the present invention, Fig. 2 is an enlarged cross-sectional view taken on the line 2—2 of Fig. 1, showing the meat filler confined within the protective casing, Fig. 3 is a plan view showing the manner in which the perforated casing splits when the sausage is heated to serving temperature.

Fig. 4 is a side elevational view, partly broken away and partly in section, of the apparatus used for perforating the sausage links.

Fig. 5 is an end elevational view of the perforating apparatus, and

Fig. 6 is an enlarged detailed side elevational view of one of the series of rollers upon which the chain of sausage links slides as it is fed over the toothed wheel of the perforating apparatus.

In the drawing, the numeral 10 designates in general a perforated sausage link made in accordance with the present invention. Each link comprises a tubular casing 11 and a processed meat stuffing 12. Each of the casings 11 is perforated as shown with a longitudinal row of spaced, minute holes 13. These holes may be spaced apart any desired distance but extensive experiments have shown a spacing of one eighth of an inch to five eighths of an inch to be the most satisfactory.

In preparing the sausages shown in the drawing an artificial tubular casing 11 is first formed in sections approximately eighteen feet in length. The meat is then ground, seasoned and stuffed tightly into the casing, a twist being put into the casing at spaced intervals to form a series of connected links. The chains of sausage links are then smoked, cooked and colored. These chains when cooled are then run through the perforating machine hereinafter to be described, and are boxed for distribution.

In Figs. 4 to 6 of the drawing is shown the preferred form of the apparatus for perforating the sausages in accordance with the present invention.

The perforating and guiding portions of the apparatus are mounted on a base designated in general by the reference numeral 14. This base 14 has an elongated planar section 15, an integral depending wall 16 and a pair of forwardly extending bifurcations 17 at the lower end of the wall 16.

Secured to the upper faces of said bifurcations 17, in any desired manner, such as by the bolts 18, are the bearing units 19. These bearing units may be of any desired standard construction which will resist both transverse and endwise thrust. Journalled for rotation in the bearing units 19 is a shaft 20. Fixedly secured to the shaft 20 at a point midway between the bearing units 19 is a disc shaped wheel 21 provided with a hub portion 21a. On the outer peripheral face of the wheel 21 are radially positioned a single row of uniformly spaced spurs 22 which are ground to fine, sharp points.

On one outer projecting end of the shaft 20 is fixedly secured a pulley wheel 23, laterally of the wall 16, which is peripherally grooved as at 24 and which may be driven by any suitable source of power not shown.

On the upper face of the elongated planar section 15 of the base 14 are positioned the feeding and guide mechanisms of the perforating apparatus.

Extending along the length of the planar section 16 on the upper face thereof and contained at either end by the stops 25 are placed side by side a plurality of highly polished rollers 26 which form what is known to the industry as the "needle blanket." Each of the rollers 26 is provided with an annular groove 27 intermediate its ends and which is of a width slightly greater than the cross-sectional width of a sausage, to provide a guide path for the chain of sausage links during the perforating operation. These highly polished rollers are free to rotate on the surface of the base section 16 as the chain of sausage links moves down the row of annular grooves 27 and over the perforating wheel 21.

On the upper face of the planar section 16 and slightly off-set from the ends of the rollers 26 is an upwardly projecting stud 27. Pivotally mounted on said stud 27 is the inner end of a lever arm 28.

Transfixing the outer end of the lever arm 28 and secured at right angles thereto by the set screw 29 is one end of a stub shaft 30, the axis of said shaft being vertically aligned with the axis of the shaft 20.

Journaled for rotation on the opposite end of the stub shaft 30 is a wheel 31, this wheel having a tapered peripheral groove 32 which is slightly wider at its widest point than the diameter of one of the sausage links. As illustrated in Figs. 4 and 5 the sausage links fed over the needle blanket has the forward or leading link travelling in substantially the plane of the upper surface of the planar section 16 and the upper side of the wheel 21 carrying the spurs 22 and the lower side of the grooved wheel 31 provide a travel path substantially in the plane of the upper surface of the planar section 16.

In Fig. 5 of the drawing it will be observed that the tapered peripheral groove 32 of the wheel 31 is slightly wider at its mouth than the spurred perforating wheel 21, but that the base of the groove 32 is narrower than said perforating wheel 21. This permits overlapping of the two wheels to assist in maintaining operative alignment, but at the same time prevents the spurs 22 from digging into the base of the groove 32 and becoming damaged therefrom when there is no chain of sausage links passing between the wheels. Thus, the wheel 31 and arm 28 are perfectly free to rise and fall to adjust to sausages of irregular contour and size, but at no time will the spurs 22 be damaged by the guide wheel.

In the use of the apparatus above described, the chain of sausage links is laid on the grooved needle blanket and the leading end of the leading link fed over the rotating toothed wheel 21 and beneath the grooved wheel 31. The groove 32 of the wheel 31 serves to guide the chain of links over the spurs 22 and the weight of the wheel 31 and its lever arm 28 serves to press each link against the spurs. Each link is thus given the row of spaced minute perforations shown in Fig. 1 of the drawing.

Repeated tests have demonstrated the consistent performance and improved qualities of sausages perforated in accordance with the present invention.

In making the tests a number of skinless sausages, a number of non-perforated cellulose cased sausages and a number of perforated cellulose cased sausages are prepared for heating in the same container of boiling water. Immediately upon immersion of the sausages the temperature of the water will drop momentarily below the boiling point. After boiling resumes and two or three minutes of heating time have elapsed, the sausages will be found to have reached the desired serving temperature. At this point the casings of the perforated links, due to the expansion of the meat contents, are ruptured between the perforations and in a few moments the entire casing, free of all meat, falls from the formed sausage and settles to the bottom of the container, resulting in a highly edible and tasteful article that has been free of contact with human hands or other extraneous contaminating objects.

At this same point the non-perforated sausages will be found to be unchanged or the meat content and casing will have simultaneously split in an irregular manner, exposing the interior of the meat.

When tasted, the skinless sausages will be found to be relatively flavorless and to have lost desirable juices.

The non-perforated cased sausages will have to be skinned before they may be eaten and it will be noted that the skin adheres strongly to the meat content, making skinning of the hot sausage exceedingly difficult.

The perforated cased sausages may be immediately eaten and will be found to be full-flavored and to have retained the desired natural juices.

It may be emphasized that sausages are thoroughly cooked during the manufacturing process and for human consumption need only be heated throughout to the desired serving temperature. This desired serving temperature and the point at which the perforated casing splits and drops off of the sausage occur simultaneously, thus insuring that the sausage will be sealed against loss of juices and the blanching action of the water during the heating period, but will be removed from the water when the casings have separated from the meat.

Extensive tests have further demonstrated that the single row of minute perforations does not appreciably affect or accelerate drying of the sausages during shipping or storage, nor do they cause loss of flavor and juices during the heating prior to the point where the casing separates from the meat.

While each sausage link has been illustrated as having a single row of perforations longitudinally thereof, it is to be understood that the sausage link may be provided with one or more lines of perforations, and while there are herein shown and described the preferred embodiments of the invention, it is to be understood that minor changes may be made therein without departing from the spirit and scope of the invention as claimed.

What is claimed is:

1. In a sausage link perforating machine, a frame, a driven, spurred perforating wheel having its axis of rotation fixed relative to said frame, a peripherally grooved guide wheel rotatably mounted on an arm pivotally attached to said frame, said guide wheel being positioned above and in planar alignment with said perforating wheel and co-acting with the peripheral edge of said perforating wheel, said arm and guide wheel having free upward pivotal movement in the plane of alignment of said wheels wherein said machine may automatically adjust for sausage links of irregular size and shape, and means on said frame for guiding a chain of sausage links between said perforating wheel and the peripheral groove of said guide wheel.

2. In a sausage link perforating machine, a frame, a driven spurred perforating wheel having its axis of rotation fixed relative to said frame, a peripherally grooved guide wheel positioned above and in planar alignment with said perforating wheel and biased against said perforating wheel by force of gravity but free to move upwardly therefrom in the plane of alignment to thereby automatically adjust for irregular sausage links, that part of the groove at the peripheral edge of said guide wheel being slightly greater in width than said perforating wheel with the sides of the groove tapering inwardly, whereby the groove at its base is of less width than said perforating wheel to thereby maintain the wheels in alignment but prevent the spurs of said perforating wheel from engaging the base of the groove.

OTTO BOLTON.

References Cited in the file of this patent

UNITED STATES PATENTS

| Number | Name | Date |
|---|---|---|
| 969,230 | Whitlock | Sept. 6, 1910 |
| 1,890,215 | De Cressey | Dec. 6, 1932 |
| 2,136,106 | Kern | Nov. 8, 1938 |
| 2,206,256 | Justice | July 2, 1940 |
| 2,236,160 | Seaman | Mar. 25, 1941 |
| 2,340,755 | Jacobson | Feb. 1, 1944 |
| 2,369,360 | Martin | Feb. 13, 1945 |
| 2,434,316 | Golden et al. | Jan. 13 1948 |